(12) United States Patent
Brown et al.

(10) Patent No.: US 9,447,740 B2
(45) Date of Patent: Sep. 20, 2016

(54) ENGINE SYSTEM HAVING HYDRAULICALLY ACTUATED GAS INJECTOR

(71) Applicant: Caterpillar Inc., Peoria, IL (US)

(72) Inventors: Aaron Michael Brown, Peoria, IL (US); David E. Hackett, Washington, IL (US); Lifeng Wang, Dunlap, IL (US); Scott F. Shafer, Morton, IL (US); Alan R. Stockner, Metamora, IL (US); Martin A. Lehman, Congerville, IL (US)

(73) Assignee: Caterpillar Inc., Peoria, IL (US)

( * ) Notice: Subject to any disclaimer, the term of this patent is extended or adjusted under 35 U.S.C. 154(b) by 183 days.

(21) Appl. No.: 14/311,770

(22) Filed: Jun. 23, 2014

(65) Prior Publication Data

US 2015/0369143 A1    Dec. 24, 2015

(51) Int. Cl.
| | |
|---|---|
| *F02M 51/00* | (2006.01) |
| *F02D 19/08* | (2006.01) |
| *F02M 21/02* | (2006.01) |
| *F02M 43/04* | (2006.01) |
| *F02M 51/06* | (2006.01) |
| *F02M 61/14* | (2006.01) |
| *F02D 19/06* | (2006.01) |
| *F02F 1/24* | (2006.01) |

(52) U.S. Cl.
CPC ............ *F02D 19/08* (2013.01); *F02D 19/0689* (2013.01); *F02D 19/0694* (2013.01); *F02F 1/242* (2013.01); *F02M 21/0254* (2013.01); *F02M 21/0275* (2013.01); *F02M 43/04* (2013.01); *F02M 51/06* (2013.01); *F02M 61/14* (2013.01)

(58) Field of Classification Search
CPC ............... F02D 19/08; F02D 19/0642; F02D 19/0689; F02D 19/0694; F02F 1/242; F02M 51/06; F02M 21/0254; F02M 43/04; F02M 61/14; F02M 61/162; F02M 61/163; F02M 61/1893
USPC ........... 123/299, 300, 525, 27 GE, 431, 575, 123/302, 308, 490; 239/533.12
See application file for complete search history.

(56) References Cited

U.S. PATENT DOCUMENTS

| | | | |
|---|---|---|---|
| 4,519,372 A | 5/1985 | Hoffman | |
| 4,574,754 A | 3/1986 | Rhoades, Jr. | |
| 4,687,136 A * | 8/1987 | Ozu ..................... | F02M 47/046 239/124 |

(Continued)

FOREIGN PATENT DOCUMENTS

| | | |
|---|---|---|
| WO | WO 2007087685 | 8/2007 |
| WO | WO 2013096280 | 6/2013 |

*Primary Examiner* — Hai Huynh
(74) *Attorney, Agent, or Firm* — Finnegan, Henderson, Farabow, Garrett & Dunner, LLP

(57) ABSTRACT

A fuel injector is disclosed for use in an engine system. The fuel injector may have a body defining a gas inlet, an oil inlet, and an oil outlet. The fuel injector may also have a nozzle connected to the body and having a base end in fluid communication with the gas inlet, and an injection tip located opposite the base end. The fuel injector may also have a valve check disposed in the nozzle and movable to selectively block and unblock the injection tip of the nozzle, and a plunger disposed in the body between the oil inlet and the oil outlet. The plunger may be movable between a flow-passing position and a flow-blocking position to cause movement of the valve check through the injection tip. The injector may further have a solenoid actuator configured to selectively move the plunger.

19 Claims, 5 Drawing Sheets

(56) References Cited

U.S. PATENT DOCUMENTS

| | | | |
|---|---|---|---|
| 5,546,902 A | 8/1996 | Paluch et al. | |
| 5,894,992 A * | 4/1999 | Liu | F02M 45/00 239/533.4 |
| 5,896,841 A * | 4/1999 | Nemoto | F02D 41/02 123/381 |
| 5,996,558 A | 12/1999 | Ouellette et al. | |
| 6,260,776 B1 * | 7/2001 | Popp | F02M 47/046 239/124 |
| 6,270,024 B1 * | 8/2001 | Popp | F02M 47/046 239/124 |
| 6,360,963 B2 * | 3/2002 | Popp | B05B 15/00 239/124 |
| 6,409,096 B2 * | 6/2002 | Popp | B05B 9/00 239/124 |
| 6,427,660 B1 * | 8/2002 | Yang | F02B 7/06 123/304 |
| 6,460,785 B2 * | 10/2002 | Popp | F02M 47/046 239/533.2 |
| 7,198,202 B2 | 4/2007 | Okada | |
| 7,958,872 B1 * | 6/2011 | Schechter | F02M 25/03 123/568.11 |
| 2007/0022977 A1 * | 2/2007 | Crower | F02B 47/02 123/25 C |
| 2013/0255636 A1 * | 10/2013 | Pursifull | F02M 47/00 123/446 |
| 2015/0198118 A1 * | 7/2015 | Leone | F02M 43/00 123/445 |

* cited by examiner

ENGINE SYSTEM HAVING HYDRAULICALLY ACTUATED GAS INJECTOR

TECHNICAL FIELD

The present disclosure relates generally to an engine system and, more particularly, to an engine system having a hydraulically actuated gas injector.

BACKGROUND

Gaseous fuel powered engines are common in many applications. For example, the engine of a locomotive can be powered by natural gas (or another gaseous fuel) alone or by a mixture of natural gas and diesel fuel. Natural gas may be more abundant and, therefore, less expensive than diesel fuel. In addition, natural gas may burn cleaner in some applications.

Natural gas has traditionally been introduced into an engine's cylinders via a solenoid operated admission valve. Although effective in some applications, a solenoid operated admission valve may not have the speed and/or force required to open fast enough or against high boost pressures in other applications.

One attempt to improve gas injection is disclosed in U.S. Pat. No. 5,996,558 of Ouellette et al. that issued on Dec. 7, 1999 ("the '558 patent"). In particular, the '558 patent discloses a hydraulic actuated gaseous fuel injector. The injector includes an oil inlet port, a gas inlet port, and a gas injection port. High-pressure oil is supplied to the oil inlet port from an in-line fuel injection pump. When the pump pressurizes the oil for injection actuation, a force is applied under a gas injection needle, causing the needle to lift away from and unblock the gas injection port. Once the needle is in an open position, fuel introduced via the gas inlet port is allowed to flow into a corresponding combustion chamber via the injection port. In some embodiments, an electronically controlled valve is used to regulate oil flow into and out of the injector.

Although the hydraulic actuated gaseous fuel injector of the '558 patent may be an improvement over a solenoid operated admission valve, the injector may still suffer drawbacks. For example, reliance on pump pressure to actuate the injector may require very precise pump control and such control may be complex and costly. In addition, a different pump may be required for each injector of a multi-cylinder engine. Further, the injector design shown in the '558 patent may lack broad applicability in engines having tight space constraints (e.g., in dual fuel engines).

The engine system of the present disclosure solves one or more of the problems set forth above and/or other problems in the art.

SUMMARY

In one aspect, the present disclosure is directed to a fuel injector. The fuel injector may include a body defining a gas inlet, an oil inlet, and an oil outlet. The fuel injector may also include a nozzle connected to the body and having a base end in fluid communication with the gas inlet, and an injection tip located opposite the base end. The fuel injector may also include a valve check disposed in the nozzle and movable to selectively block and unblock the injection tip of the nozzle, and a plunger disposed in the body between the oil inlet and the oil outlet. The plunger may be movable between a flow-passing position and a flow-blocking position to cause movement of the valve check through the injection tip. The injector may further include a solenoid actuator configured to selectively move the plunger.

In another aspect, the present disclosure is directed to a cylinder head assembly. The cylinder head assembly may include a cylinder head having a fire deck defining at least one intake port and at least one exhaust port, and at least one gas exchange valve disposed within each of the at least one intake and exhaust ports. The cylinder head assembly may also include a liquid fuel injector centrally mounted within the cylinder head between the at least one intake and exhaust ports and configured to axially inject liquid fuel through the fire deck. The cylinder head assembly may further include a gas injector mounted at a periphery of the cylinder head and configured to inject gaseous fuel at an oblique angle through the fire deck.

In another aspect, the present disclosure is directed to an engine system. The engine system may include an engine block at least partially defining a plurality of cylinders, and a plurality of pistons each disposed within one of the plurality of cylinders. The engine system may also include a plurality of cylinder heads each configured to engage the engine block and close off one or more of the plurality of cylinders to form a plurality of combustion chambers. The engine system may further include a liquid fuel injector disposed axially within each of the plurality of cylinder heads, and a gas injector disposed at an oblique angle within each of the plurality of cylinder heads. The engine system may additionally include a supply of liquid fuel in communication with each liquid fuel injector, a supply of gaseous fuel in communication with each gas injector, and a single oil pump in communication with each gas injector and configured to supply pressurized oil that actuates the gas injector.

DETAILED DESCRIPTION

Figure 1:
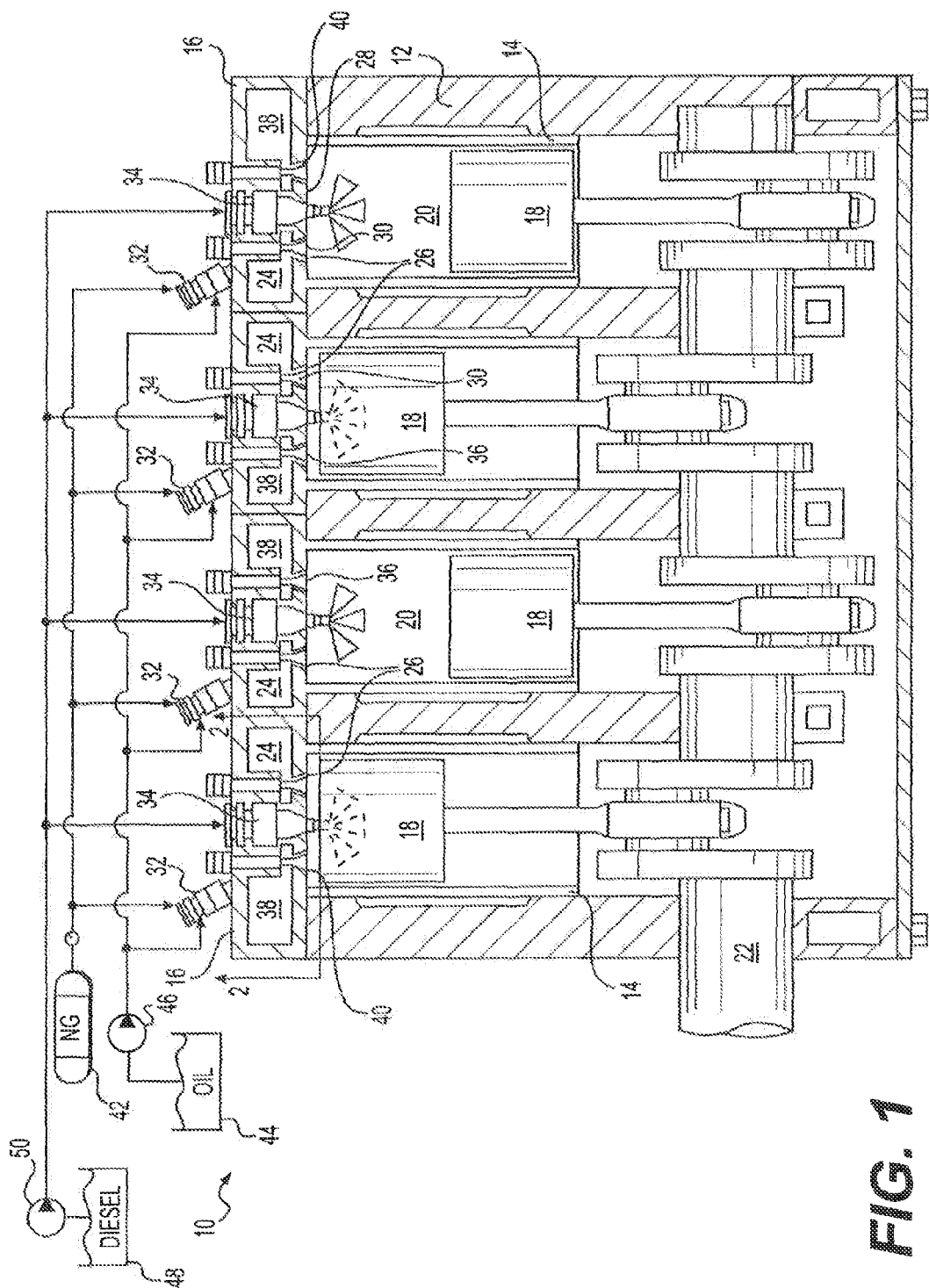
FIG. 1 is a cross-sectional illustration of an exemplary disclosed engine system.

FIG. 1 illustrates an exemplary engine system 10. Although engine system 10 is shown and described below as embodying a four-stroke dual fuel engine, it is contemplated that engine system 10 may be another type of engine (e.g., a four-stroke gaseous fueled engine or a two-stroke dual fuel or gaseous fueled engine), if desired. Engine system 10 may include, among other things, an engine block 12 defining a plurality of cylinders 14. A cylinder head 16 may be connected to engine block 12 to close off an end of each cylinder 14, and a piston 18 may be slidably disposed within cylinder 14. Piston 18, together with cylinder 14 and cylinder head 16, may define a combustion chamber 20. It is contemplated that engine system 10 may include any number of combustion chambers 20 and that combustion chambers 20 may be disposed in an "in-line" configuration, in a "V" configuration, in an opposing-piston configuration, or in any other suitable configuration.

Piston 18 may be configured to reciprocate within cylinder 14 between a top-dead-center position (TDC) and a bottom-dead-center position (BDC). In particular, piston 18 may be pivotally connected to a crankshaft 22, which is rotatably disposed within engine block 12. In this configuration, a sliding motion of each piston 18 within a corresponding cylinder 14 may result in a rotation of crankshaft 22. Similarly, a rotation of crankshaft 22 may result in the sliding motion of piston 18. As crankshaft 22 rotates through about 360°, each piston 18 may move through four different strokes. Specifically, engine system 10 (as a four-stroke engine) may undergo a complete combustion cycle that includes an intake stroke (TDC to BDC), a compression stroke (BDC to TDC), a power stroke (TDC to BDC), and an exhaust stroke (BDC to TDC).

During the intake stroke, air may be drawn and/or forced into combustion chamber 20 from an intake manifold 24 via one or more intake ports 26 located within cylinder head 16 (e.g., located within a fire deck 28 of cylinder head 16). In particular, as piston 18 moves downward within cylinder 14 toward BDC, one or more gas exchange valves (e.g., intake valves) 30 associated with intake ports 26 may be caused to move and open intake ports 26. When intake ports 26 are open and a pressure of air within intake manifold 24 is greater than a pressure within combustion chamber 20, air should pass through intake ports 26 into combustion chamber 20.

Gaseous fuel (e.g., natural gas) may be mixed with the air before, during, and/or after the air enters combustion chamber 20. In the disclosed embodiment, a gas injector 32 is mounted at an oblique angle (i.e., with respect to fire deck 28) within each cylinder head 16 to provide non-axial/non-radial injections of gaseous fuel. The gaseous fuel from injector 32 may mix with the air from intake ports 26 to form a fuel/air mixture within combustion chamber 20.

During the compression stroke, air may still be entering combustion chamber 20 via intake ports 26 as piston 18 starts its upward stroke to mix any residual gas with air and fuel in combustion chamber 20. Eventually, intake ports 26 may be blocked by motion of intake valves 30, and further upward motion of piston 18 may then compress the mixture. As the mixture within combustion chamber 20 is compressed, the mixture will increase in pressure and temperature until it combusts and releases chemical energy. This may result in a further and significant increase in the pressure and temperature within combustion chamber 20. It should be noted that, in a dual-fuel engine, an injection of liquid fuel (e.g., of diesel fuel) may be necessary to cause the mixture within combustion chamber 20 to ignite. For this purpose, a liquid fuel injector 34 may be centrally mounted within cylinder head 16 to axially inject liquid fuel into combustion chamber 20.

After piston 18 reaches TDC, the increased pressure caused by combustion may force piston 18 back downward, thereby imparting mechanical power to crankshaft 22 during the power stroke. Then during the ensuing exhaust stroke, one or more gas exchange valves (e.g., exhaust valves) 36 located within cylinder head 16 may open to allow pressurized exhaust within combustion chamber 20 to exit into an associated exhaust manifold 38 via corresponding exhaust ports 40. In particular, as piston 18 moves upward within cylinder liner 16, a position will eventually be reached at which one or more gas exchange valves (e.g., exhaust valves) 36 move to fluidly communicate combustion chamber 20 with exhaust manifold 38 by way of ports 40. When combustion chamber 20 is in fluid communication with exhaust manifold 38 and a pressure in combustion chamber 20 is greater than a pressure in exhaust manifold 38, exhaust should pass from combustion chamber 20 through exhaust ports 40 into exhaust manifold 38.

In the disclosed embodiment, movement of intake and exhaust valves 30, 36 may be cyclically controlled, for example by way of an overhead cam (not shown), rocker arm (not shown), and/or other device that is mounted to or above cylinder head 16 and mechanically driven by crankshaft 22. It is contemplated, however, that movement of intake and/or exhaust valves 30, 36 may alternatively be controlled in a non-cyclical manner, if desired. It is also contemplated that intake and/or exhaust ports 26, 40 could alternatively be located within an annular wall of cylinder 14, with their openings and closings dictated by the motion of piston 18. Although operation of a four-stroke engine has been described with reference to FIG. 1, one skilled in the art would understand that gaseous and liquid fuel may be combusted and exhaust may be generated in a similar manner in a two-stroke engine.

The gaseous fuel sprayed by injectors 32 into combustion chambers 20 may be provided from a supply 42. Supply 42 may embody, for example, a high-pressure cryogenic tank configured to hold liquid fuel (e.g., liquefied natural gas—LNG) at low temperatures. The liquid fuel may be vaporized prior to entering injectors 32. In some applications, a heater, accumulator, and/or pressure regulator may be used to vaporize, contain, and circulate the fuel.

In addition to gaseous fuel being directed to injectors 32, a supply 44 of pressurized actuating fluid (e.g., engine oil, diesel fuel oil, dedicated hydraulic oil, etc.) may also be directed to injectors 32. As will be described in more detail below, this fluid may be used to selectively open and close injectors 32, allowing a desired amount of gaseous fuel to be injected into combustion chambers 20 at a desired timing. A single pump 46 may be used to pressurize the actuating fluid for all injectors 32. In one embodiment, pump 46 is a separate pump dedicated to facilitating only fuel injection. In another embodiment, pump 46 may be used for additional purposes (e.g., to circulate engine oil throughout engine system 10 for lubrication and/or cooling purposes), if desired.

The liquid fuel sprayed by injectors 34 into combustion chambers 20 may be provided from a supply 48. Supply 48 may embody, for example, a low-pressure tank configured to hold liquid fuel (e.g., diesel fuel) at ambient conditions. A single pump 50 may be used to pressurize the liquid fuel for all injectors 34. In one embodiment, pump 50 and pump 46 may be the same pump, if desired. For example, pump 46/50 may supply pressurized diesel fuel to injectors 34 for direct injection into combustion chambers 20, and also to gas injectors 32 in order to cause actuation of gas injectors 32 and the above-described injection of gaseous fuel.

Figure 2:
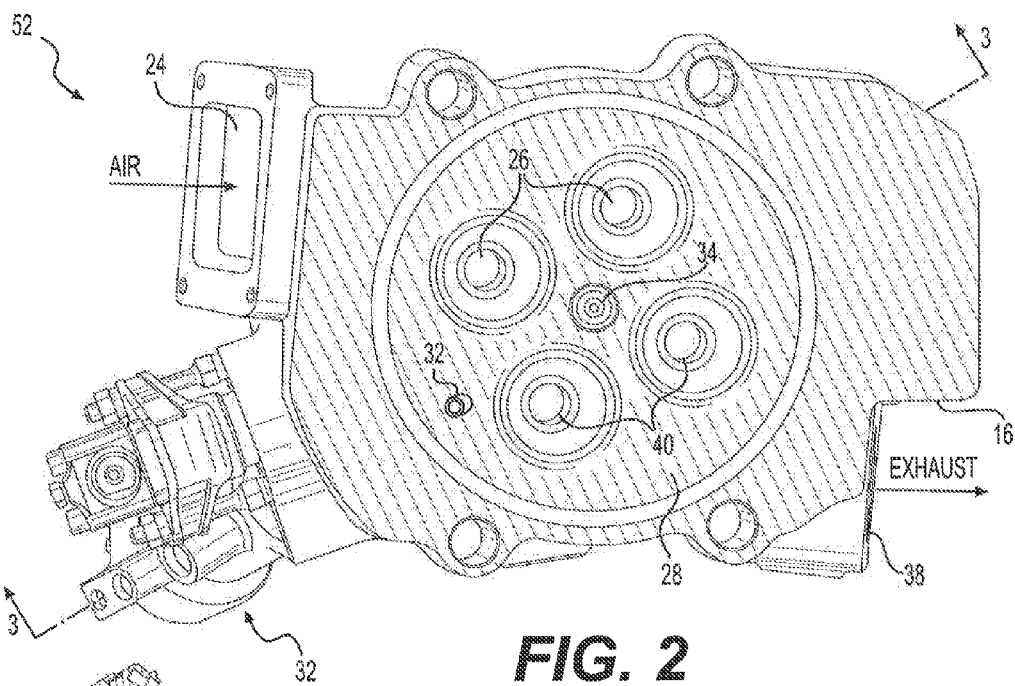
FIG. 2 is an isometric illustration of an exemplary disclosed cylinder head assembly that may be used in conjunction with the engine system of FIG. 1.
Figure 3:
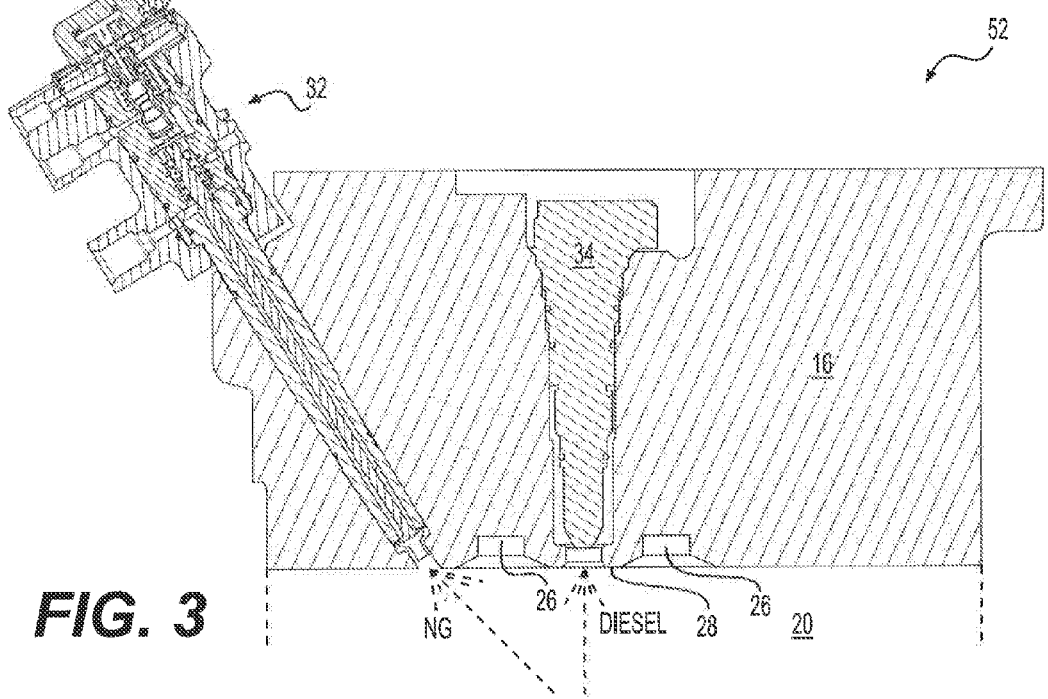
FIG. 3 is a cross-sectional illustration of the cylinder head assembly of FIG. 2.

FIGS. 2 and 3 illustrate an exemplary cylinder head assembly 52 having injectors 32 and 34 mounted within cylinder head 16. As shown in these figures, liquid fuel injector 34 may be centrally located (e.g., aligned with a central axis of fire deck 28, at a center of all ports 26, 40), while gas injector 32 may be located at a periphery of fire deck 28 and extend to a location between one intake port 26 and one adjacent exhaust port 40. Injector 34 may be completely mounted inside a recess of cylinder head 16 and oriented vertically. In contrast, a majority of injector 32 may be mounted outside of cylinder head 16 and injector 32 may be oriented at an oblique angle. In the disclosed embodiment, only a nozzle portion of injector 32 may be mounted inside of cylinder head 16. Injector 32 may be generally located adjacent intake manifold 24 and in alignment with exhaust manifold 38. Injector 34 may inject liquid fuel axially into combustion chamber 20, while injector 32 may inject gaseous fuel at an oblique angle, such that the gaseous fuel injection intersects with the liquid fuel injection at a center of combustion chamber 20.

Figure 4:
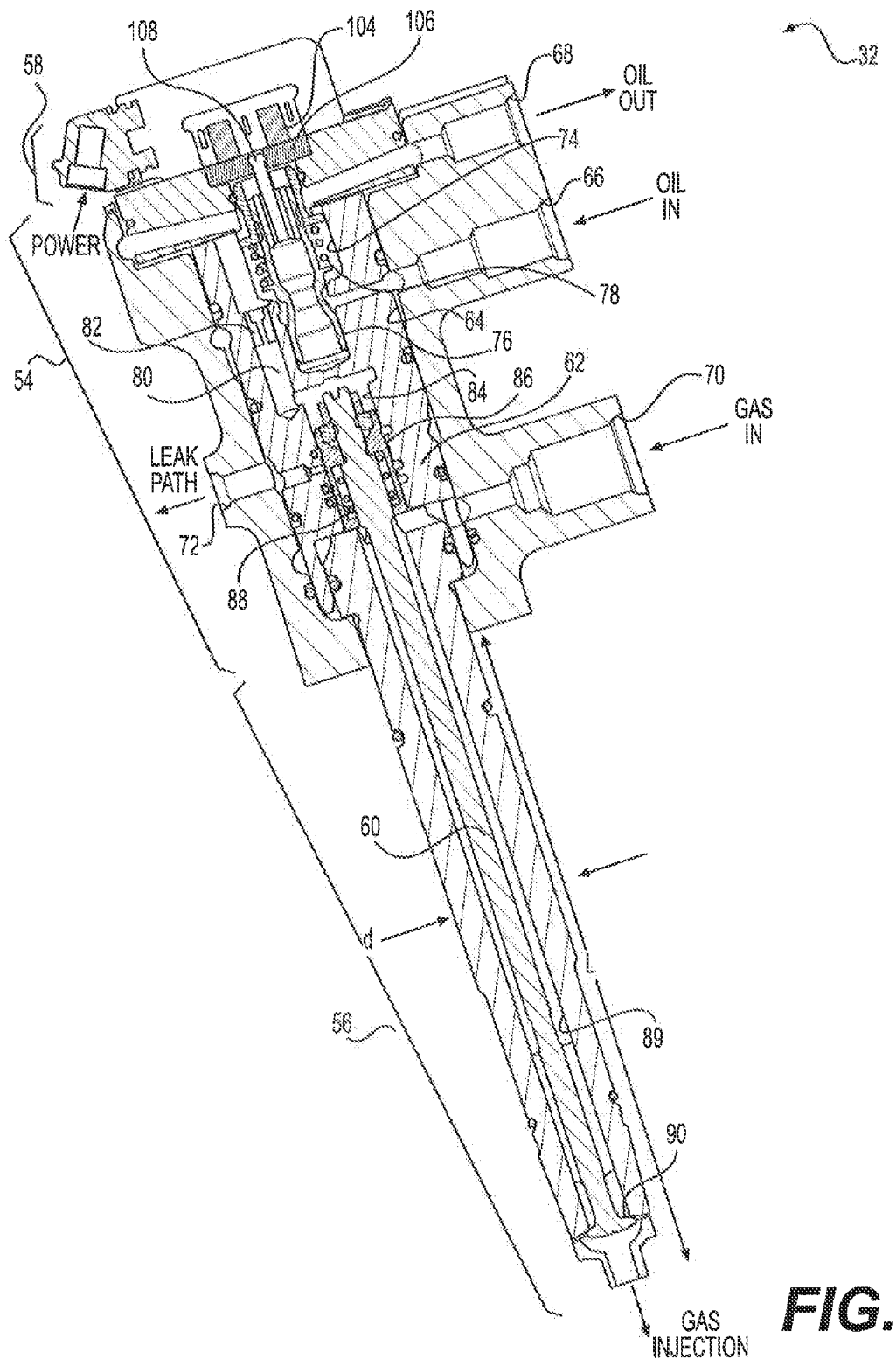
FIG. 4 is a cross-sectional illustration of an exemplary disclosed gas injector that may be used in conjunction with the head assembly of FIGS. 2 and 3.

An exemplary gas injector 32 is shown in FIG. 4. Injector 32 may include, among other things, a body 54, a nozzle 56 operably connected to body 54, an actuator 58 connected to body 54 at an end opposite nozzle 56, and a valve check 60 slidingly disposed within nozzle 56. It is contemplated that additional components may be included within fuel injector 32 such as, for example, pressure-balancing passageways, accumulators, check valves, filters, and other injector components known in the art.

Injector body 54 may be a cylindrical member configured for mounting outside of cylinder head 16, and include one or more passageways formed within a cage insert ("insert") 62. In the disclosed embodiment, injector body 54 includes a central bore 64 configured to receive insert 62, an oil inlet 66, an oil outlet 68, a gas inlet 70, and a return outlet 72. Oil inlet 66 may extend from a connection with pump 46 (referring to FIG. 1) radially inward to central bore 64 to supply insert 62 with oil (or another actuating fluid) used to initiate gas injections. Oil outlet 68 may extend radially back outward from central bore 64 to direct lower pressure oil from insert 62 back to supply 44. Gas inlet 70 may extend from a connection with supply 42 to an interface with nozzle 56. It is contemplated that additional, fewer, and/or different passages may be included within injector body 54, if desired.

Insert 62 may embody a cylindrical member received within central bore 64 of body 54, at an axial location between nozzle 56 and actuator 58. Insert 62 may have an internally formed control chamber 74 that is in fluid communication with a base end of valve check 60, and with both of oil inlet 66 and oil outlet 68. A plunger 76 may be disposed within control chamber 74 and selectively moved (e.g., by actuator 58) to drain or fill control chamber 74 with pressurized oil. When control chamber 74 is drained of pressurized oil, valve check 60 may be moved to and/or maintained in a closed position at which injections of gaseous fuel are blocked. When control chamber 74 is filled with pressurized oil, valve check 60 may be moved by the pressurized oil to an open position at which gaseous fuel injections are allowed.

Plunger 76 may function as a spool valve, having a plurality of lands and a plurality of annular grooves located between the lands. When plunger 76 is moved to a first position (shown in FIG. 4), communication between oil inlet 66 and control chamber 74 may be blocked by a first of the lands. At this same time, control chamber 74 and oil outlet 68 may be facilitated via a first of the annular grooves, allowing oil to drain from control chamber 74 and from the base end of valve check 60. When plunger 76 is moved to a second position (not shown), the communication between oil inlet 66 and control chamber 74 may be facilitated via a second of the annular grooves, allowing oil to fill control chamber 74. At this same time, communication between oil outlet 68 and control chamber 74 may be blocked by a second of the lands, causing a pressure within control chamber 74 to build and act against the base end of valve check 60. Plunger 76 may be biased (e.g., via a spring 78) toward the first position, and selectively moved to the second position by energizing actuator 58.

Control chamber 74 may be in communication with the base end of valve check 60 via a passage 80. In the disclosed embodiment, a restricted orifice 82 may be placed within passage 80 to apply a desired amount of restriction on oil flow from control chamber 74. This restriction may be selectively varied, and thereby allow for tuning of the responsiveness of injector 32. For example, a first restricted orifice 82 may be replaced with a second restricted orifice 82 having a different amount of restriction, so as to vary the flow rate of fluid to valve check 60 and the corresponding responsiveness of injector 32. It is contemplated that restricted orifice 82 may be omitted, if desired.

The base end of valve check 60 may reciprocate within a bore 84 of insert 62, in general alignment with control chamber 74. A piston sleeve 86 may be rigidly connected to the base end of valve check 60, and configured to multiply the force exerted on valve check 60 by the pressurized oil. Piston sleeve 86 may be biased (e.g., via a spring 88) upward against the pressure of the oil, such that the oil must have a minimum threshold pressure in order to move valve check 60 and initiate gas injection. In the disclosed embodiment, return outlet 72 may intersect with bore 84 at an intermediate axial location of piston sleeve 86. A first seal (e.g., an oil seal) may be disposed around piston sleeve 86 at a location between return outlet 72 and passage 80, while at least one seal (e.g., two gas seals) may be disposed around piston sleeve 86 at a location between return outlet 72 and nozzle 56. Return outlet 72 may allow any oil and/or gas that leaked past the seals to drain away from injector 32. In one embodiment, a coalescing filter (not shown) may be connected to return outlet 72 to separate oil from gas in the leak path. Any number of seals may be located between insert 62 and body 54, as desired.

Nozzle 56 may likewise embody a cylindrical member and have a central bore 89 configured to receive valve check 60. A space between walls of central bore 89 and valve check 60 may form a pressure chamber that holds a supply of pressurized gaseous fuel received from gas inlet 70 in anticipation of an injection event. Nozzle 56 may also include one or more orifices 90 that allow the pressurized gaseous fuel to flow from the pressure chamber into combustion chamber 20 of engine system 10, as valve check 60 is pushed downward through orifice 90. The pressure chamber may be arranged along the entire length of nozzle 56, between gas inlet 70 and orifice 90.

Nozzle 56 may also be used to connect injector 32 to cylinder head 16. In particular, nozzle 56 may extend into a tilted bore of cylinder head 16 (referring to FIG. 3), and include external threads that engage internal threads of the bore. In the disclosed embodiment, only nozzle 56 may be mounted inside of cylinder head 16, with a remainder of injector 32 being located outside. Nozzle 56 may be elongated to facilitate this connection at the oblique mounting angle of injector 32. In one embodiment, nozzle 56 may have a diameter-to-length ratio (i.e., d:L—see FIG. 4) of about 0.123-0.125:1. This configuration may allow for injector 32 to be located at a corner of cylinder head 16, away from other interfering components (e.g., away from an overhead cam, rocker arm, gas exchange valve, injector 34, etc.), and yet still inject gaseous fuel toward a center of combustion chamber 20.

Valve check 60 may be an elongated cylindrical member that is slidingly disposed within nozzle 56. Valve check 60 may be axially movable between a first position at which a tip end substantially blocks a flow of fuel through orifice 90, and a second position at which orifice 90 is open to allow a flow of fuel into combustion chamber 20.

Figure 5:
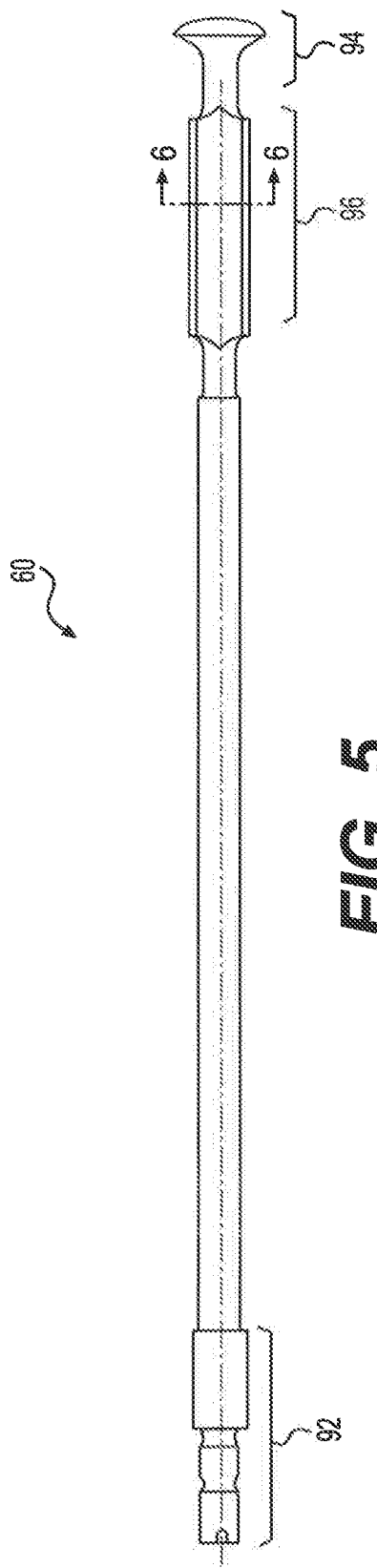
FIGS. 5 and 6 are side and end view illustrations of an exemplary disclosed valve check that may be used in conjunction with the gas injector of FIG. 4.
Figure 6:
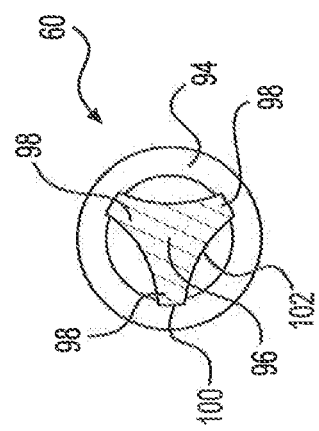

An exemplary valve check 60 is shown in FIGS. 5 and 6. As can be seen in these figures, valve check 60 may include a base end 92, to which piston sleeve 86 (see FIG. 4) connects, and an opposing tip end 94 that selectively engages orifice 90 of nozzle 56. In addition, valve check 60 may include a guide 96 located proximate tip end 94.

As shown in FIG. 5, tip end 94 may have a tulip shape, such that valve check 60 functions as a tulip valve. Specifically, tip end 94 may have a frustoconical shape that trumpets or flares outward toward the distal end. In some embodiments, a face surface at the end of the tulip shape may be flat or even cupped (e.g., to resemble a tulip flower). In the disclosed embodiment, however, the face surface is convex. With this configuration, the flare surface may function as an internal sealing surface configured to engage an annular shoulder, ridge, or knife edge of nozzle 56 at orifice 90. The rounded face surface may increase a strength of tip end 94.

As shown in FIG. 6, guide 96 may have generally triangular cross-section, with three spokes or legs 98 that protrude outward at equally spaced angles. In the disclosed embodiment, a distal end surface 100 of each leg 98 is curved to match an internal contour of nozzle bore 89. In this configuration, surfaces 100 may ride against the internal wall of bore 89, thereby spacing valve check 60 at a center of bore 89. In this same configuration, side wall surfaces 102 of each leg 98 may be curved (e.g., concave) so as to increase a cross-sectional flow area within bore 89 for the gaseous fuel passing thereby. It is contemplated that surfaces 102 of legs 98 could alternatively be planar, if desired.

Returning to FIG. 4, actuator 58 may be disposed at an end of injector 32 that is opposite nozzle 56 to control the forces acting on valve check 60. In particular actuator 58 may include windings 104 of a suitable shape and size through which current may flow to establish a magnetic field, and an armature 106 associated with windings 104. Armature 106 may be fixedly connected to a pin 108, which may in turn be fixedly connected to an end of plunger 76. When windings 104 are energized, a magnetic field established by windings 104 may pull armature 106, pin 108, and plunger 76 upward against the bias of spring 78 from a first or non-injecting position to a second or injecting position. When windings 104 are de-energized, spring 78 may be allowed to push pin 108 and plunger 76 back down into the non-injecting position. In this manner, the timing and level of the induced current within windings 104 may be controlled to affect injections of gaseous fuel.

Figure 7:
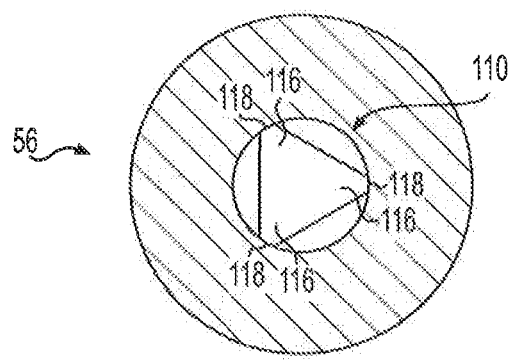
FIGS. 7 and 8 are cross-section side and end views of another exemplary disclosed valve check that may be used in conjunction with the gas injector of FIG. 4.
Figure 8:
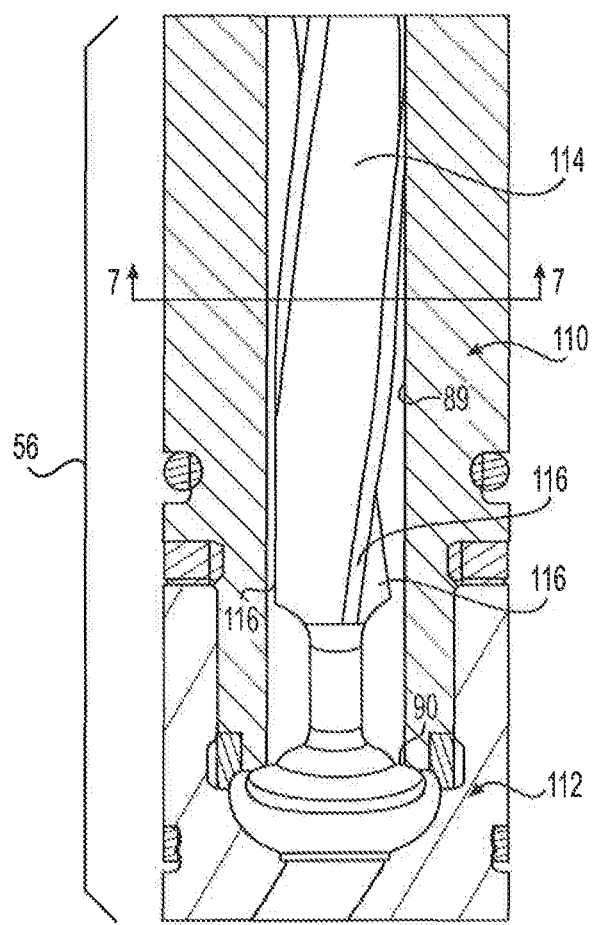

FIGS. 7 and 8 illustrate an alternative valve check 110 disposed within nozzle 56 of injector 32. Like valve check 60 shown in FIGS. 5 and 6, valve check 110 may also include a base end (not shown), a tip end 112, and a triangularly shaped guide 114 located between the base end and tip end 112. And guide 114 may have three spokes or legs 116 that protrude radially outward at equidistant angles. In this embodiment, legs 116 may be generally planar, and end surfaces 118 of each leg 116 may be generally curved to match the profile of bore 89. However, in contrast to guide 114 of valve check 60 shown in FIGS. 5 and 6, guide 114 of valve check 110 may twist within bore 89 to have a helical shape. The twist of guide 114, in combination with a length thereof, may provide for one full rotation (i.e., about 360° of rotation—⅓ rotation for each leg 116), such that in the end view of FIG. 7, a complete circle is formed by legs 116. This helical shape and rotation angle may provide for enhanced guiding of valve check 60 within nozzle 56.

INDUSTRIAL APPLICABILITY

The disclosed engine system may be used in any machine or power system application where it is beneficial to reduce emissions of exhaust gases, while also delivering power output. The disclosed engine system finds particular applicability within mobile machines, such as locomotives, large construction equipment, marine vessels, power generation, oil pumping, etc., which can operate using both liquid and gaseous fuels. The disclosed engine system may provide a unique way to deliver gaseous fuel, which is known to produce lower levels of regulated exhaust constituents, to an engine cylinder that is already crowded with other components (e.g., liquid fuel injectors, exhaust valves, intake valves, exhaust manifolds, intake manifolds, overhead cam, rocker arm, etc.). Operation of engine system 10 will now be explained in detail.

During normal operation of engine system 10, gaseous fuel and liquid fuel may be supplied to each of injectors 32, 34, respectively, from supplies 42, 48 (referring to FIG. 1). For example, liquefied natural gas may be vaporized, and directed through a regulator and/or other control mechanism to the gas inlet 70 of all injector 32. In addition, an actuating fluid (e.g., engine oil, hydraulic fluid, diesel fuel, etc.) may be drawn from supply 44, pressurized and directed to all oil inlets 66 of injectors 32. At the same time, diesel fuel may be drawn from supply 48 by pump 50, pressurized, and directed to all injectors 34 in parallel. Injectors 32 and 34 may then be independently controlled to inject natural gas alone, diesel fuel alone, or a mixture of natural gas and diesel.

Actuator 58 may be selectively energized to initiate injections of natural gas into combustion chambers 20 (referring to FIG. 1) by injectors 32. In particular, when an electrical current is applied to windings 104, armature 106, pin 108, and plunger 76 may be pulled upward away from nozzle 56. As plunger 76 moves upward, control chamber 74 may be fluidly connected with oil inlet 66 and simultaneously blocked from oil outlet 68, thereby causing control chamber 74 to fill with pressurized oil. At this point in time, the high pressure oil may also communicate with the base end of valve check 60 and with piston sleeve 86, causing them to overcome the bias of spring 88. When this happens, valve check 60 may be urged to move downward through orifice 90, thereby opening orifice 90 and initiating an injection event.

To end the injection event, actuator 58 may be de-energized to allow spring 78 to return armature 106, pin 108, and plunger 76 back downward until communication between control chamber 74 and oil inlet 66 is blocked and communication between control chamber 74 and oil outlet is re-established. At this point in time, the pressure within control chamber 74 may drop, allowing valve check 60 to return (under the bias of spring 88) to its closed position at which tip end 94 blocks gas flow through orifice 90. During the opening and closing movements of valve check 60, guide 96 may ensure proper seating and unseating of tip end 94 by centering valve check 60 within bore 89.

Because operation of injector 32 may rely on individual solenoid control, control may be simple and relatively inexpensive. In addition, each injector 32 may be separately controlled, thereby enhancing performance of engine system 10. Further, the design of injector 32, having a long and narrow nozzle, with only the nozzle being mounted inside a corresponding cylinder head at any available angle, may allow broad applicability in engines having tight space constraints.

It will be apparent to those skilled in the art that various modifications and variations can be made to the disclosed engine systems without departing from the scope of the disclosure. Other embodiments of the engine systems will be apparent to those skilled in the art from consideration of the specification and practice of the engine systems disclosed herein. It is intended that that the specification and examples be considered as exemplary only, with a true scope of the disclosure being indicated by the following claims and their equivalents.

What is claimed is:

1. A fuel injector, comprising:
   a body defining a gas inlet, an oil inlet, and an oil outlet;
   a nozzle connected to the body, the nozzle defining a nozzle bore and having a base end in fluid communication with the gas inlet, and an injection tip located opposite the base end;
   a valve check disposed in the nozzle bore and movable to selectively block and unblock the injection tip of the nozzle, the valve check including
      a guide located proximate to the injection tip, the guide including a plurality of legs extending outwardly from the valve check, each of the plurality of legs including a surface configured to cooperate with the nozzle bore to position the valve check within the bore;
   a plunger disposed in the body between the oil inlet and the oil outlet, and movable between a flow-passing position and a flow-blocking position to cause movement of the valve check through the injection tip; and
   a solenoid actuator configured to selectively move the plunger.

2. The fuel injector of claim 1, wherein the valve check include a tulip-shaped end located outside the nozzle and configured to selectively engage the injection tip to block the injection tip.

3. The fuel injector of claim 2, wherein:
   the valve check includes a base end opposite the tulip-shaped end;
   the body further defines a control chamber at the base end of the nozzle; and
   fuel injector further includes a piston sleeve connected to the base end of the valve check and located in the control chamber,
   wherein movement of the plunger selectively pressurizes the control cavity causing the tulip shaped end to move away from the injection tip and allow gas to flow through the injection tip.

4. The fuel injector of claim 3, wherein a diameter to length ratio of the nozzle is about 0.123-0.125:1.

5. The fuel injector of claim 3, further including a plurality of seals disposed around the piston sleeve.

6. The fuel injector of claim 5, wherein:
   the body further defines an oil leak port; and
   the plurality of seals includes:
      at least one oil seal located between the control chamber and the oil leak port; and
      at least one gas seal located between the oil leak port and the nozzle.

7. The fuel injector of claim 3, further including:
   a first spring disposed inside the piston sleeve and configured to bias the piston sleeve and valve check to a closed position; and
   a second spring configured to bias the plunger to the flow-blocking position.

8. The fuel injector of claim 1, wherein the guide includes three legs arranged in a generally triangular cross-section.

9. The fuel injector of claim 8, wherein each of the three legs is disposed helically about the valve check and includes at least one-third of a full twist.

10. The fuel injector of claim 1, further including a pressure chamber disposed within the nozzle and extending from the base end to the injection tip.

11. A cylinder head assembly, comprising:
    a cylinder head having a fire deck defining at least one intake port and at least one exhaust port;
    at least one gas exchange valve disposed within each of the at least one intake and exhaust ports;
    a liquid fuel injector centrally mounted within the cylinder head between the at least one intake and exhaust ports and configured to axially inject liquid fuel through the fire; and
    a gas injector mounted at a periphery of the cylinder head and configured to inject gaseous fuel at an oblique angle through the fire deck, the gas injector including
       a body defining a gas inlet, an oil inlet, and an oil outlet,
       a nozzle connected to the body, the nozzle defining a nozzle bore and having a base end in fluid communication with the gas inlet, and an injection tip located opposite the base end,
       a valve check disposed in the nozzle bore and movable to selectively block and unblock the injection tip of the nozzle, the valve check including
       a guide located proximate to the injection tip, the guide including a plurality of legs extending outwardly from the valve check, each of the plurality of legs including a surface configured to cooperate with the nozzle bore to position the valve check within the bore,
       a plunger disposed in the body between the oil inlet and the oil outlet, and movable between a flow-passing position and a flow-blocking position to cause movement of the valve check through the injection tip, and
       a solenoid actuator configured to selectively move the plunger.

12. The cylinder head assembly of claim 11, wherein:
    a majority of the liquid fuel injector is disposed inside the cylinder head; and
    a majority of the gas injector is disposed outside the cylinder head.

13. The cylinder head assembly of claim 12, wherein:
    only the nozzle of the gas injector is disposed inside the cylinder head.

14. The cylinder head assembly of claim 11, wherein:
    the at least one intake port includes two intake ports;
    the at least one exhaust port includes two exhaust ports;
    the liquid fuel injector is centrally disposed between the two intake ports and the two exhaust ports; and
    the gas injector is disposed at a periphery of the fire deck, between one of the two intake ports and one of the two exhaust ports.

15. The cylinder head assembly of claim 11, wherein the gas injector is oriented to inject gaseous fuel to intersect with an injection of liquid fuel from the liquid fuel injector.

16. An engine system, comprising:
    an engine block at least partially defining a plurality of cylinders;
    a plurality of pistons, each disposed within one of the plurality of cylinders;

a plurality of cylinder heads, each configured to engage the engine block and close off one or more of the plurality of cylinders to form a plurality of combustion chambers;

a liquid fuel injector disposed axially within each of the plurality of cylinder heads; and a gas injector disposed at an oblique angle within each of the plurality of cylinder heads, the gas injector including
- a body defining a gas inlet, an oil inlet, and an oil outlet,
- a nozzle connected to the body, the nozzle defining a nozzle bore and having a base end in fluid communication with the gas inlet, and an injection tip located opposite the base end,
- a valve check disposed in the nozzle bore and movable to selectively block and unblock the injection tip of the nozzle, the valve check including
  - a guide located proximate to the injection tip, the guide including a plurality of legs extending outwardly from the valve check, each of the plurality of legs including a surface configured to cooperate with the nozzle bore to position the valve check within the bore,
- a plunger disposed in the body between the oil inlet and the oil outlet, and movable between a flow-passing position and a flow-blocking position to cause movement of the valve check through the injection tip, and
- a solenoid actuator configured to selectively move the plunger;

a supply of liquid fuel in communication with each liquid fuel injector;

a supply of gaseous fuel in communication with each gas injector; and a single oil pump in communication with each gas injector and configured to supply pressurized oil that actuates the gas injector.

17. The engine system of claim 16, wherein:

a majority of the liquid fuel injector is disposed inside a corresponding one of the plurality of cylinder heads; and a majority of the gas injector is disposed outside the corresponding one of the plurality of cylinder heads.

18. The engine system of claim 17, wherein:

the nozzle of the gas injector is disposed inside the corresponding one of the plurality of cylinder heads, and the body of the gas injector is disposed outside the corresponding one of the plurality of cylinder heads; and a diameter to length ratio of the nozzle is about 0.123-0.125:1.

19. The engine system of claim 16, wherein:

the liquid fuel injector is configured supply all fuel consumed by the engine system alone during a first mode of operation; and the liquid fuel and gas injectors are configured to supply fuel at the same time during a second mode of operation.

* * * * *